United States Patent [19]

Lebrun et al.

[11] Patent Number: 4,866,149

[45] Date of Patent: Sep. 12, 1989

[54] PROCESS FOR CATALYTIC TREATMENT OF A POLYSILAZANE CONTAINING ON AVERAGE AT LEAST TWO HYDROCARBON GROUPS HAVING ALIPHATIC UNSATURATION PER MOLECULE

[75] Inventors: Jean-Jacque Lebrun, Caluire; Hugues Porte, Lyon, both of France

[73] Assignee: Rhone-Poulenc Specialites Chimiques, Courbevoie, France

[21] Appl. No.: 935,926

[22] Filed: Nov. 28, 1986

[30] Foreign Application Priority Data

Nov. 28, 1985 [FR] France ................................ 85 17817

[51] Int. Cl.⁴ .......................................... C08F 130/08
[52] U.S. Cl. .................................... 526/279; 525/474; 525/475; 526/90; 526/185; 526/189; 526/238; 528/28
[58] Field of Search ................ 525/474, 475; 526/279, 526/90, 185, 189, 238; 528/28

[56] References Cited

U.S. PATENT DOCUMENTS

| | | |
|---|---|---|
| 2,579,418 | 12/1951 | Cheronis . |
| 3,007,886 | 11/1961 | Cannady . |
| 3,098,830 | 7/1963 | Rochow . |
| 3,187,030 | 6/1965 | Verbeek . |
| 3,322,722 | 5/1967 | Haluska . |
| 3,431,222 | 3/1969 | Fink ................................ 528/28 |
| 3,553,242 | 1/1971 | Fink . |
| 3,853,567 | 12/1974 | Verbeek . |
| 3,892,583 | 7/1975 | Winter et al. . |
| 4,048,415 | 9/1977 | Matsuzawa et al. ............... 526/128 |
| 4,135,045 | 1/1979 | Matsuzawa et al. ............... 526/128 |
| 4,142,991 | 3/1979 | Arzoumanidis et al. ........... 526/115 |
| 4,312,970 | 1/1982 | Gaul ................................... 526/279 |
| 4,444,967 | 4/1984 | Arzoumanidis et al. ........... 526/119 |
| 4,482,669 | 11/1984 | Seyferth ............................ 525/474 |
| 4,482,689 | 11/1984 | Haluska . |
| 4,535,007 | 8/1985 | Cannady . |
| 4,675,424 | 6/1987 | King, III ............................ 528/28 |

FOREIGN PATENT DOCUMENTS

| | | |
|---|---|---|
| 075826 | 9/1982 | European Pat. Off. . |
| 82108675.8 | 9/1982 | European Pat. Off. . |
| 881178 | 6/1960 | United Kingdom . |

*Primary Examiner*—Paul R. Michl
*Assistant Examiner*—Lee C. Wright
*Attorney, Agent, or Firm*—Burns, Doane, Swecker & Mathis

[57] ABSTRACT

A process for treating a polysilazane, characterized in that a polysilazane possessing on average at least two, and preferably at least three, hydrocarbon groups having aliphatic unsaturation per molecule is treated catalytically in the presence of a catalytically efficient amount of a co-ordination catalyst. The polysilazanes treated in this manner possess high thermal resistance and can be used, in particular, as precursors of ceramic products, with a high yield of inorganic product.

16 Claims, No Drawings

PROCESS FOR CATALYTIC TREATMENT OF A POLYSILAZANE CONTAINING ON AVERAGE AT LEAST TWO HYDROCARBON GROUPS HAVING ALIPHATIC UNSATURATION PER MOLECULE

BACKGROUND OF THE INVENTION

The present invention relates to a process for catalytic treatment of a polysilazane containing, on average, at least two hydrocarbon groups having aliphatic unsaturation in each molecule.

Organopolysilazanes, hereinafter referred to as polysilazanes, are well known products which take the form of monomers, oligomers and polymers which may be cyclic or linear, and may be in the form of resinous polymers. The polysilazanes can be prepared according to a wide variety of processes, using an extensive range of starting materials.

These polysilazanes can, in particular, be shaped and can be pyrolysed in the form of $Si_3N_4$, SiC or mixtures thereof. Another method of manufacturing silicon nitride consists of reacting chlorosilanes ($SiCL_4$, $HSiCl_3$ and $H_2SiCl_2$) with ammonia at high temperature and in the vapour phase. This method leads directly to a powdered product, making it difficult to manufacture articles in the form, in particular, of fibers. Polysilazanes, in contrast, can be spun in continuous fibers, the pyrolysis of which leads to ceramic fibers.

Polysilazanes can be prepared in the form of thinner or thicker films or of moulded solid articles, and used as a binder for cermaic fiber or carbon fiber, and as a sintering binder for porous ceramic articles.

It is, nevertheless, difficult to shape these polysilazanes easily and economically in the form of fibers or coatings which, after pyrolysis, give ceramic products in the form of fibers, films, thinner or thicker coatings and molded articles.

In U.S. Pat. No. 3,853,567, an attempt was made to provide a solution to the above problem by manufacturing shaped articles such as fibers containing silicon carbide, silicon nitride or mixtures thereof with other ceramic products, by performing a first heat treatment of a polysilazane at a temperature between 200° C. and 800° C., to obtain a fusible carbosilazane resin which can be spun in the molten state and then pyrolyzed at a temperature of between 800° C. and 2000° C.

The above patent admittedly represents a substantial advance, but it has the dual disadvantage of requiring a first heat treatment at a temperature which can already be very high (200°-800° C.) and of working a carbosilazane in the molten state under anhydrous conditions and in an inert atmosphere. In addition, the yield by weight of ceramic can be insufficient.

In Japanese Patent Application No. KOKAI 77/160,446, a process is described for polymerization of high molecular weight organopolysilazanes using acid earths as a catalyst for treatment of the organopolysilazanes. This process, however, has the major disadvantage of requiring separation of the solid catalyst by filtration, involving the use of solvents in the case of polymers which attain high viscosities.

Moreover, the above-cited Japanese patent application exludes the possibility of using polysilazanes possessing=SiH groups, although, without giving examples, it does not exclude the possibility of using polysilazanes possessing unsaturated aliphatic hydrocarbon groups linked to the silicon atoms, such as alkenyl groups, for example vinyl or allyl groups. Nevertheless, the teaching of this patent application is limited to a polymerization reaction by opening silazane bonds.

U.S. Pat. No. 3,007,886 describes a process for treating polysilazanes with metal salts of monocarboxylic acids which are soluble in hydrocarbon solvents. U.S. Pat. No. 3,187,030 describes a process for treating polysilazanes with particular metal salts of strong inorganic acids, the catalysis being provided by the metal cations which perform the role of Lewis acids. The teaching of these two patents is limited to a polymerization reaction by opening silazane bonds.

SUMMARY OF THE INVENTION

The object of the present invention is to provide a simple, efficient and economic means which is easy to implement for preparing in the most diverse forms (threads, moulded articles, coatings, films, and the like) polysilazanes which, when pyrolyzed at a temperature of between 1000° C. and 2000° C., give ceramic products possessing excellent properties.

It is a further object of the present invention to have readily available a polysilazane which is rather stable to hydrolysis and which leads on pyrolysis to a high yield by weight of a ceramic material. For this purpose, it is necessary for the polysilazane to have good thermal resistance on pyrolysis, while remaining firmly attached to the support to be coated and impregnated.

These objects and others are achieved by the present invention, which is a process for catalytic treatment of a polysilazane, comprising treating at least one polysilazane possessing on average at least two, and preferably at least three, hydrocarbon groups having aliphatic unsaturation per molecule with a catalytically effective amount of a catalyst for co-ordination of aliphatic unsaturation.

DETAILED DESCRIPTION OF THE INVENTION

The starting polysilazane used for carrying out the process of the invention possesses at least two, and preferably at least three, units per molecule chosen from the units of formulae (Ia), (Ib) and (Ic):

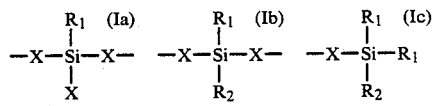

$R_1$ is chosen from hydrocarbon radicals having alkenic or alkynic aliphatic unsaturation. The radicals $R_1$ may be identical or different substituents in each formula (Ia), (Ib) and (Ic). The radicals $R_2$, which may be identical or different in each of the above formulas, are chosen from the radicals $R_1$, a hydrogen atom, a saturated aliphatic hydrocarbon radical and an aryl, alkylaryl or arylalkyl radical. The links X, which may be identical or different in each formula (Ia), (Ib) and (Ic), denotes $(CH_2)_n$ links (n being an integer between 1 and 8), —Si— or N—, at least 50% of the links X being N—. Preferably, X is chosen from N— and —Si—.

In the starting polysilazane, the units other than (Ia), (Ib) and (Ic) can be units chosen from the units for formulas:

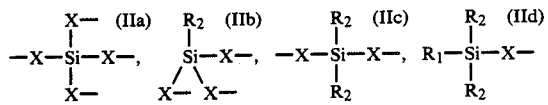

in which the radicals $R_2$ and the links X have the meaning given above for $R_2$ and X in formulas (Ia), (Ib) and (Ic).

In the formulas (Ib) and (Ic), (IIb), (IIc) and (IId), the radical $R_1$ can be an aliphatically unsaturated radical preferably selected from the group of aliphatically unsaturated radicals having from 2 to 8 carbon atoms. Examples of such aliphatically unsaturated radicals include ethynyl and propynyl radicals and the like, vinyl and allyl radicals and the like, and cycloalkenyl radicals such as cyclopentenyl, cyclohexenyl, cycloheptenyl and cyclooctenyl radicals. The vinyl radical is the preferred radical.

In the formulas (Ib) and (Ic), (IIb), (IIc) and (IId), the radical $R_2$ can be a saturated aliphatic hydrocarbon radicals. $R_2$ is preferably selected from the group of saturated aliphatic hydrocarbon radicals having from 1 to 8 carbon atoms, such as a methyl, ethyl, propyl, butyl, pentyl, hexyl, heptyl and octyl hydrocarbon radical having from 3 to 7 carbon atoms, such as a cyclopropyl, cyclobutyl, cyclopentyl, cyclohexyl and cycloheptyl radical, an arylalkyl radical such as benzyl and phenylethyl radicals, or an alkylaryl radical such as tolyl and xylyl. Methyl and phenyl radicals are the more preferred radicals for $R_2$ in formulas (Ib), (Ic), (IIb), (IIc) and (IId).

The above polysilazanes are well known products, described in detail in the literature. They can be obtained, in particular, as the product of reaction of at least one organohalomonosilane of formula:

$$R_aY_{4-a}Si$$

in which Y is a halogen, preferably a chlorine atom, the radical or radicals R, which may be identical or different, can have the definitions of $R_1$ and $R_2$ given above, including the definitions of $R_1$ and $R_2$ given for formulas (Ib), (Ic), (IIb), (IIc) and (IId), a is 0, 1, 2 or 3 and is the same number throughout the formula, with an organic organosilyl compound containing at least one $NH_2$ or NH group such as, for example, ammonia, primary or secondary amines, silylamines, amides, hydrazines, hydrazides, and the like.

In the following paragraphs, $Vi=CH_2=CH-$.

The following are examples of organohalosilane which can be used alone or mixed:
$(CH_3)_2SiCl_2$, $(CH_3)_3SiCl$, $CH_3SiCl_3$, $SiCl_4$,
$Vi_3SiCl$, $Vi_2SiCl_2$, $ViSiCl_3$,
$(C_6H_5)_2SiCl_2$, $(C_6H_5)(CH_3)SiCl_2$,
$C_6H_5SiCl_3$, $(CH_3)_2ViSiCl$
$(CH_3)(CH_3CH_2)SiCl_2$, $CH_3ViSiCl_2$,
$CH_3HSiCl_2$, $H_2SiCl_2$, $(CH_3)_2HSiCl$, $HSiCl_3$.

All or part of the starting organohalosilanes can be replaced by at least one organohalodisilane of formula:

$$R_b Cl_{3-b} SiSiR_c Cl_{3-c}$$

in which the radicals R, which may be identical or different, can have the definitions given above for $R_1$ and $R_2$, including the definitions of $R_1$ and $R_2$ given for formulas (Ib), (Ic), (IIb), (IIc) and (IId); b is 0, 1, 2 or 3 and c is 0, 1 or 2, for the purpose of making organo(disilyl)silazanes.

As examples of compounds containing at least one $NH_2$ or NH group which can be used for the synthesis of the above polysilazanes, there may be mentioned: ammonia, methylamine, dimethylamine, ethylamine, cyclopropylamine, hydrazine, methylhydrazine, ethylenediamine, tetramethylenediamine, hexamethylenediamine, aniline, methylaniline, diphenylamine, toluidine, guanidine, aminoguanidine, urea, hexamethyldisilazane, diphenyltetramethyldisilazane, tetraphenyldimethyldisilazane, tetramethyldivinyldisilazane, dimethyldiphenyldivinyldisilazane and tetramethyldisilazane.

The starting polysilazanes possessing units such as those corresponding to the formulae (Ia), (Ib), (Ic), (IIa), (IIb), (IIc) and (IId) above can be prepared according to well-known methods such as, for example, those described in Journal of Polymer Science A 2 3 179 (1964) and by Redl, Silazane Polymer, Arpa-19, Advanced Research Projects Agency, October 1965, and in U.S. Pat. Nos. 3,853,567 and 3,892,583, in European Patent 75,826 and in French Patent No. 2,497,812. The disclosures of the foregoing documents relating to polysilazanes are incorporated by reference herein.

The starting polysilazanes prepared from ammonia are generally known as ammonolysates and the starting polysilazanes prepared from an amino compound as mentioned above are known as aminolysates, which hence include ammonolysates.

In the aminolysates, the notion of the functionality is altered by defining a functionality $f^N=1$ contributed by an Si-N bond. Thus, in aminolysates of the polysilazane type, the following units are distinguished:

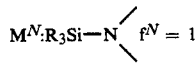

$$M^N:R_3Si-N\quad f^N=1$$

considered to be monofunctional;

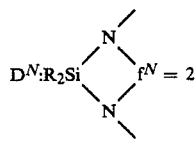

$$D^N:R_2Si\quad f^N=2$$

considered to be difunctional;

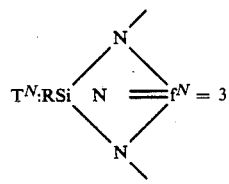

$$T^N:RSi\quad f^N=3$$

considered to be trifunctional; and

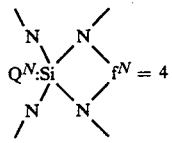

considered to be tetrafunctional.

The starting aminolysates are generally in the form of a liquid of low or high viscosity, or even in the pasty state, ranging up to the solid state.

In fact, these aminolysates generally include an amount, which can be quite large, of species of low molecular mass which are likely to be removed on pyrolysis, and which consequently decrease proportionately the yield by weight of ceramic product with respect to the starting substance.

Furthermore, these aminolysates, especially in the case where they include a high content of difunctional silicon (for example $D^N$), do not have sufficient thermal stability on pyrolysis. They are degraded by rupture of the bonds:

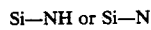

Si—NH or Si—N to give rise to volatile oligomers which proportionately decrease the yield by weight of ceramic product with respect to the starting substance.

Altogether unexpectedly, the process of the invention, which includes a catalytic treatment, enables, on the one hand the volatiles to be incorporated in the macromolecules of the aminolysate, and on the other hand, in the presence of tri functional silicon-containing units (for example $T^N$), enables the network of the aminolysate to be rearranged and hypercrosslinked, thereby being more heat stable on pyrolysis. The catalytic treatment of the invention hence induces, depending on the nature of the starting aminolysate, a polymerization and/or a copolymerization and/or a rearrangement of the molecules.

In effect, while there is no wish to be confined to a scientific explanation, the process of treatment according to the invention makes it possible, not only to polymerize by opening silazane bonds the polysilazane oligomers originating from aminolysis or coaminolysis, but also to crosslink and/or polymerize by reacting a vinyl radical activated by the co-ordination catalyst with another vinyl or a primary or secondary nitrogen.

Another very important advantage deriving from the catalytic treatment according to the invention is the production of a treated aminolysate having improved resistance to oxygen and moisture in the air.

The catalyst is generally used at concentrations of between 1 and 10,000 ppm of acid with respect to the starting polysilazane, and preferably between 10 and 5,000 ppm.

The reaction temperature is between 20° C. and 180° C., preferably between 120° C. and 160° C.

The reaction can be performed without a solvent, which represents a distinct advantage. Nevertheless, it is possible to use an organic solvent such as toluene, methylene chloride, benzene, xylene, hexane, heptane and the like. The reaction can be performed at atmospheric pressure, under pressure or under reduced pressure. The reaction time naturally depends on the concentration of catalyst and the temperature of the reaction. For a temperature of between 120° C. and 160° C. and a concentration of acid between 10 and 5,000 ppm, the reaction time is advantageously between 30 minutes and 30 hours.

By catalyst for co-ordination of aliphatic unsaturation according to the invention, there is understood a compound capable of activating the unsaturation and initiating the reactions mentioned above. These co-ordination catalysts include, in particular, Bronsted acids, Lewis acids and catalysts of the Ziegler-Natta type.

Among Bronsted acids, strong inorganic or organic acids are preferably used. By strong inorganic or organic acids, there is understood, according to the invention, any acid present or generated in situ in the reaction medium, which possesses for its most acidic hydrogen atom a $PK_a$ in water of less than 5. The acids which are preferably used in the present invention are trifluoromethanesulphonic, perchloric, trichloromethanesulphonic, trichloromethanecarboxylic, trichloroacetic, hydrochloric, acetic, nitric, picric, pyrophosphoric, chromic, p-toluenesulphonic and chloroplatinic acids.

The term strong inorganic or organic acid also includes ion exchange resins possessing strong acid anions absorbed or bound to the resins. Examples of these resins are the sulphonated ion exchange resins described, for example, in U.S. Pat. Nos. 3,037,052 and 3,322,722. The disclosures of these documents relating to ion exchange resins are incorporated by reference herein. It is also possible to use acid earths, such as acid earths sold as TONSIL ® brand or ACTISIL ® brand, or montmorillonite washed with sulphuric acid. It is also possible to use a catalyst such as SPHEROSIL ® brand, consisting of a porous inorganic support covered with a polymeric film bearing sulphonic or phosphonic groups as described, for example, in French Patent No. A 2,505,850.

By Lewis acids, there are understood, according to the invention, the acidifying products and agents which correspond to the traditional definition of Lewis acids, such as, for example, $AlCl_3$. The preferred Lewis acids which can be used in the process of the invention are, in particular:

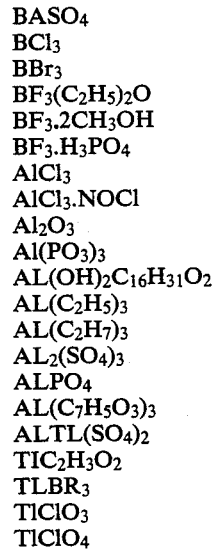

$BASO_4$
$BCl_3$
$BBr_3$
$BF_3(C_2H_5)_2O$
$BF_3.2CH_3OH$
$BF_3.H_3PO_4$
$AlCl_3$
$AlCl_3.NOCl$
$Al_2O_3$
$Al(PO_3)_3$
$AL(OH)_2C_{16}H_{31}O_2$
$AL(C_2H_5)_3$
$AL(C_2H_7)_3$
$AL_2(SO_4)_3$
$ALPO_4$
$AL(C_7H_5O_3)_3$
$ALTL(SO_4)_2$
$TIC_2H_3O_2$
$TLBR_3$
$TlClO_3$
$TlClO_4$

Ziegler-Natta catalysts are well known to those versed in the art, and it is possible to use, in particular, the catalysts described on page 553 of the book "Principles de polymerisation" (Principles of Polymerization) by George ODIAN, McGraw-Hill Book Company, 1970, and on page 183 of the work "Polymer Chemistry" by Bruna Vollmert, Spring-Verlag, 1973. The disclosures of these books relating to Ziegler-Natta catalysts are incorporated by reference herein.

Among these catalysts, $TiCl_4$, $TiCl_3$, $(C_2H_5)_3AL$, $(C_2H_5)AlCl_2$, $ZrCl_4$, $CrCl_2$ and $(C_2H_5)_2TiCl_2$ are preferred.

In the application as coating, films and thin layers, the organopolysilazane composition treated according to the invention is preferably used without a solvent. In this case, a viscosity at 25° C. is chosen to be between 10 and 5,000 mPa.s, and preferably between 100 and 1,000 mPa.s.

Higher viscosities can be used, but it is then necessary, when it is desired to use the compositions for coating or impregnating a support, to solubilize the composition in an organic solvent which is compatible with polysilazanes, such as benzene, toluene, hexane, cyclohexane, isopropyl ether, ethyl ether, dichloromethane and chlorobenzene.

In the application as fibers, viscositites higher than 5,000 mPa.s should be used. It is possible to work without a solvent in the molten state, or in solution, the crosslinking being performed on emergence from the die by passage through an oven and/or by irradiation (UV, electron beams).

The polysilazane compositions according to the invention can, in addition, contain fillers, preferably chosen from $SiO_2$, $Si_3N_4$, SiC, BN, $B_2O_3$, $B_4C$, ALN, $AL_2O_3$, $AL_4C_3$, TiN, $TiO_2$, TiC, $ZrO_2$, ZrC, $Vo_2$ and the like.

The polysilazane composition according to the invention can, in addition, serve as a matrix for ceramic fibers made, in particular, of SiC, $SiO_2$, $Si_3N_4$, $B_4C$, and the like.

The polysilazane composition according to the invention is especially useful for coating or impregnating rigid or flexible supports made of metal or of ceramic fibers.

The supports covered or impregnated with the hardened composition, or the fibers, can immediately or subsequently undergo a pyrolysis treatment, preferably under vacuum or under pressure or under an inert atmosphere, with a temperature rise ranging from the crosslinking temperature to 1,500°-2,000° C., depending on the desired nature of the ceramic or binder.

The composition according to the invention hence enables intermediate semi-finished products to be made, which are capable of being stored in the ambient air and can subsequently be pyrolysed.

This hence represents an especially advantageous process for depositing or impregnating a ceramic material on a support, and for obtaining ceramic fibers and sintering binders.

In the examples which follow, which illustrate the invention without limiting its scope, the polysilazanes obtained, catalytically treated or otherwise, are analysed by thermogravimetric analysis (TGA), pyrolysing them from the ambient temperature (20° C.) to 1,400° C. under nitrogen with a rate of temperature rise of 2° C./minute. The TGA yield (% by weight of solid residue at 1,400° C.) is given in the examples.

The viscosity is measured at 25° C and given in mPa.s. In addition, $Me=CH_3$ in the formulas, and the ammonolysis and coammonolysis reactions are performed in a first three-liter reactor I of cylindrical shape (equipped with a jacket to cool the reaction bulk). The reactor is surmounted by a gas condenser. Mechanical stirring is provided by two RUSHTON ® vanes (one vane having perpendicular blades, one vane having sloping blades) arranged along the stirrer shaft. The introduction of $N_2$ and $NH_3$ gases is carried out via a narrow tube dipping into the solution to cause the $NH_3$ to emerge immediately below the first stirrer vane. At the end of the ammonolysis, the reaction mixture is drawn off and introduced into a second reactor II equipped with mechanical stirring (RUSHTON ® brand vane with perpendicular blades) and a filter bed (average porosity 10 μm). The ammonolysates are filtered and the rinsing solvents are introduced into a third six liter reactor III equipped with a jacket and with mechanical stirring by a RUSHTON ® brand vane with perpendicular blades. In this reactor, in which the catalytic treatment is performed, inert conditions are created by using $N_2$ or by placing the reactor under vacuum (25 mbar).

The whole installation is placed under an inert atmosphere for several hours before the operation. The whole reaction, ammonolysis, filtration and evaporation of the solvent, is carried out under dry nitrogen. The products obtained are placed in sealed bottles in which an inert atmosphere has been created with nitrogen, and stored, weighed and handled in a glove box in which an inert atmosphere has been created with nitrogen.

In the Examples which follow, except where otherwise stated, the percentages given are by weight.

EXAMPLE 1

203 g of $MeViSiCl_2$ (1.44 mol) of 99% purity are placed in the reactor I in the presence of 1.3 liter of isopropyl ether. Ammonia is introduced into the reactor I at a flow rate of 6 cm³/s, with $N_2$ added at a flow rate of 3 cm³/s, for 6 hours 30 minutes (equivalent to approximately 6.1 mols of $NH_3$ introduced). The temperature of the reactor I is maintained at 2° C. during the introduction of $NH_3$ (6 hours), and is brought to 20° C. with the continued introduction of $NH_3$ for 1 hour 30 minutes. The ammonium chloride removed is dried under vacuum and weighed.

After removal of the solvent under vacuum (25 mbar at 60° C. followed by 1.5 mbar at 60° C. for 1 hour), 119 g of a clear liquid of viscosity 3 mPa.s at 25° C. are recovered. The yield by weight of the reaction is 97%.

The solvents recovered are analysed by gas chromatography to identify and quantify the level of volatiles removed during the devolatilization of the product.

The product itself is analysed by IR, $^{29}Si$ NMR and $^1H$ proton NMR (NMR 360 MHz in $C_6D_6$), and subjected to gas chromatography. It consists mainly of two cyclic products:

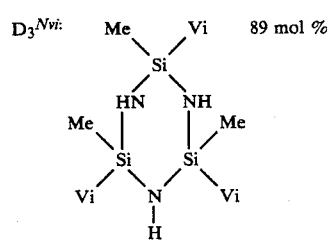

and $D_4^{Nvi}$:

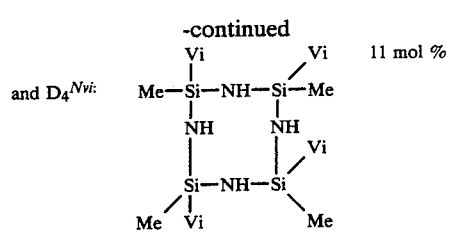
11 mol %

COMPARATIVE EXAMPLE 2a AND EXAMPLES 3 TO 8:

In these examples, the ammonolysate obtained in Example 1 is treated in the reactor III with different acid catalysts, using an initial concentration of $3 \times 10^{-2}$ moles per liter.

The comparative example 2A is performed without a catalyst. The experimental conditions of treatment and the results obtained are collated in Table I below.

TABLE I

| EXAMPLE | ACID | T in °C. | Time in hours | Y* % | TGA % |
|---|---|---|---|---|---|
| 2A | — | — | — | 4 | |
| 3 | CCl₃COOH | 140 | 3 h 00 | 10 | 58 |
| 4 | CH₃SO₃H | 140 | 3 h 00 | 15 | 40 |
| 5 | CH₃COOH | 140 | 4 h 00 | 8 | 46 |
| 6 | HClO₄ | 140 | 3 h 00 | 10 | 56 |
| 7 | CF₃SO₃H | 140 | 1 h 00 | 65 | 65 |
| 8 | CF₃SO₃H | 140 | 3 h 00 | 99 | 62 |

*Y = yield of polymer, measured in the following manner: 2 g of product are introduced into a beaker (handling under dry N₂), which is brought to 175° C. (for two hours under a vacuum of 1.3 mbar). After being cooled, the beaker is weighed, thereby enabling the yield of polymer to be measured.

EXAMPLE 9

According to the process of Example 1, coammonolysis is performed with the following:

| | |
|---|---|
| 107.2 g of CH₃SiCl₃ | (0.72 mol) |
| 46.25 g of (CH₃)₂SiCl₂ | (0.36 mol) |
| 50.76 g of CH₃(CH₂=CH)SiCl₂ | (0.36 mol) |

The reaction is carried out in the presence of 1.3 liter of isopropyl ether. The reaction is performed at 2° C. with a flow rate of NH₃=6 cm³/s for 6 hours 45 minutes. 98.7 g of a viscous oil of viscosity 110 mPa.s are recovered, equivalent to a yield by weight of the coammonolysis of 95%.

The product was identified by ²⁹Si NMR, proton NMR and IR. Its composition corresponds well with that of the substances introduced: $T^N/D^N=1$ and $D^{NVi}/D^N=1$.

COMPARATIVE EXAMPLE 10a AND EXAMPLES 11 TO 14

In these examples, the coammonolysate obtained in Example 9 is treated in the reactor III with different acid catalysts, using an initial concentration of $3 \times 10^{-2}$ moles per liter. The comparative example 10a is performed without a catalyst. The experimental conditions of the treatment and the results obtained are collated in Table II below.

TABLE II

| EXAMPLE | ACID | T in °C. | Time in in Hours | Y* % | TGA % |
|---|---|---|---|---|---|
| 10a | — | — | — | 70 | 40 |
| 11 | CH₃SO₃H | 140 | 5 h 00 | 68 | 54 |
| 12 | CF₃COOH | 140 | 3 h 00 | 94 | 65 |
| 13 | HClO₄ | 140 | 3 h 00 | 91 | 72 |
| 14 | CF₃SO₃H | 140 | 0 h 30 | 95 | 72 |

*Y = yield of polymer, measured in the following manner: 2 g of product are introduced into a beaker (handling under dry N₂), which is brought to 175° C. (for two hours under a vacuum of 1.3 mbar). After being cooled, the beaker is weighed, thereby enabling the yield of polymer to be measured.

We claim:

1. A process for catalytic treatment of a polysilazane comprising catalytically contacting at least one starting polysilazane having on average at least two hydrocarbon groups having aliphatic unsaturation in each molecule, with a catalytically effective amount of a catalyst for coordination of aliphatic unsaturation, wherein said catalyst is a Bronsted acid.

2. A process according to claim 1 wherein said polysilazane has on average at least three hydrocarbon groups having aliphatic unsaturation in each molecule.

3. A process according to claim 1 wherein said catalyst is selected from the group consisting of strong organic or inorganic acids.

4. A process according to claim 3 wherein said catalyst is present at a concentration between about 10 ppm and 5,000 ppm of acid with respect to said starting polysilazane.

5. A process according to claim 3 wherein said catalyst is selected from the group consisting of strong organic or inorganic acids.

6. A process according to claim 5 wherein said catalyst is selected from the group consisting of trifluoromethanesulphonic, perchloric, trichloromethanesulphonic, trichloromethanecarboxylic, trichloroacetic, hydrochloric, acetic, nitric, picric, pyrophosphoric, chromic, p-toluenesulphonic and chloroplatinic acids.

7. A process according to claim 5 wherein said catalyst is selected from the group consisting of ion exchange resins posessing strong acid anions absorbed or bound to the resin.

8. A process according to claim 5 wherein said catalyst is selected from the group consisting of acid earths and porous inorganic supports covered with a polymeric film bearing a sulphonic acid or phosphoric acid group.

9. A process according to claim 1 wherein said treatment of a polysilazane is conducted without a solvent.

10. A process according to claim 1 wherein said treatment of a polysilazane is conducted in the presence of an organic solvent.

11. A process according to claim 2 wherein said treatment of a polysilazane is conducted in the presence of an organic solvent.

12. A process according to claim 10 wherein said solvent is selected from the group consisting of toluene, methylene chloride, benzene, xylene, hexane and heptane.

13. A process according to claim 3 wherein said treatment is conducted at a temperature between 20° C. and 180° C.

14. A process as recited in claim 13 wherein said treatment is conducted between 120° C. and 160° C.

15. A process according to claim 4 wherein said treatment is conducted between 120° C. and 160° C.

16. A process according to claim 15 wherein said reaction time is between 30 minutes and 30 hours.

* * * * *